US007539309B2

United States Patent
Stadelmann et al.

(10) Patent No.: US 7,539,309 B2
(45) Date of Patent: May 26, 2009

(54) METHOD AND SYSTEM FOR GSM AUTHENTICATION DURING WLAN ROAMING

(75) Inventors: Toni Stadelmann, Bolligen (CH); Michael Kauz, Lausanne (CH)

(73) Assignee: Togewa Holding AG, Bern (CH)

( * ) Notice: Subject to any disclaimer, the term of this patent is extended or adjusted under 35 U.S.C. 154(b) by 722 days.

(21) Appl. No.: 10/522,767

(22) PCT Filed: Aug. 16, 2002

(86) PCT No.: PCT/CH02/00452

§ 371 (c)(1),
(2), (4) Date: Feb. 1, 2005

(87) PCT Pub. No.: WO2004/017564

PCT Pub. Date: Feb. 26, 2004

(65) Prior Publication Data

US 2005/0177733 A1 Aug. 11, 2005

(51) Int. Cl.
*H04K 1/00* (2006.01)
(52) U.S. Cl. .................. 380/270; 726/9; 713/185
(58) Field of Classification Search ............ 713/185; 726/9; 380/270, 272

See application file for complete search history.

(56) References Cited

U.S. PATENT DOCUMENTS 7,107,620 B2 * 9/2006 Haverinen et al. ............ 726/29

FOREIGN PATENT DOCUMENTS

| WO | WO 01/76134 A1 | 10/2001 |
| WO | WO 02/03730 A1 | 1/2002 |

OTHER PUBLICATIONS

Ostrowski, "Roaming und Handover Zwischen UMTS Und Funk-LAN", XP001124094, vol. 55, No. 6, pp. 24-26, (2002).

* cited by examiner

*Primary Examiner*—Kambiz Zand
*Assistant Examiner*—Shahrouz Yousefi
(74) *Attorney, Agent, or Firm*—Oliff & Berridge, PLC

(57) ABSTRACT

The invention relates to a method for automatic roaming between heterogeneous WLANs and/or GSM/GPRS/UMTS networks, in which method, for authentication, a mobile IP node (20) requests access to the WLAN at an access point (21, 22), in which method, upon request from the access server (23), the mobile IP node (20) transmits an IMSI stored on a SIM card (201) of the mobile IP node (20) to the access server (23), and in which method, based on the IMSI, using information stored in an SIM user database (34), the logic IP data channel of the WLAN is supplemented user-specifically towards corresponding GSM data for signal and data channels of a GSM network, and the authentication of the IP nodes (20) is carried out in an HLR (37) and/or VLR (37) of a GSM network.

14 Claims, 5 Drawing Sheets

METHOD AND SYSTEM FOR GSM AUTHENTICATION DURING WLAN ROAMING

Figure 1:
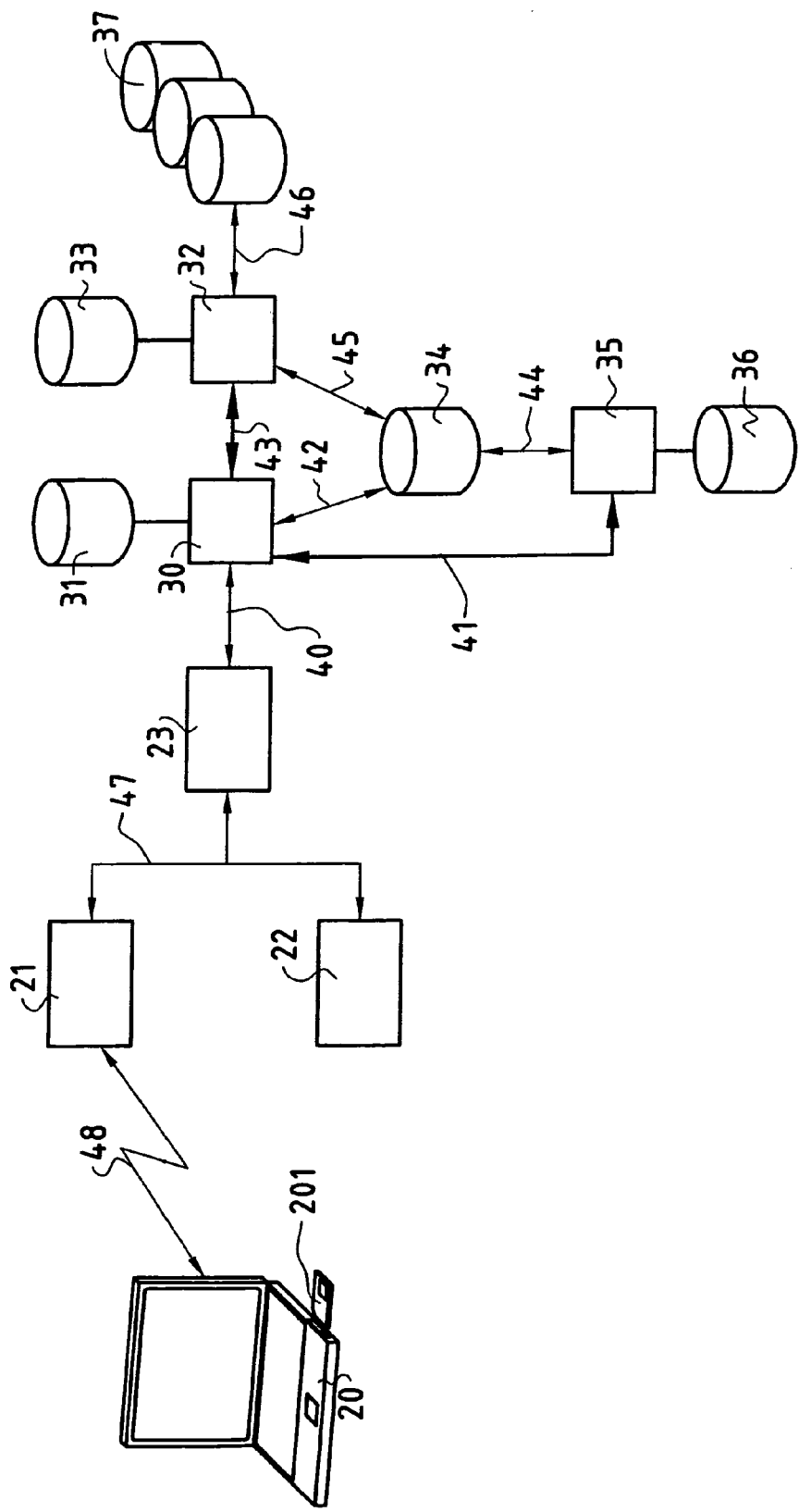

The invention presented here relates to a method and system for automatic roaming between different WLANs and/or GSM/GPRS/UMTS networks, where for authentication a mobile IP node requests access to the WLAN through an access server via a wireless interface within the basic service area of a WLAN, whereby the basic service area of the WLAN includes of one or more access points assigned to the access server, and whereby the mobile IP node is authenticated by means of an IMSI stored on the SIM card of the IP-Node. Most especially the invention relates to a method for mobile nodes in heterogeneous WLANs.

In the last years the worldwide number of Internet users, and thereby the amount of information being offered there, has increased exponentially. However, even though the Internet offers worldwide access to information, the user does not normally have access to it until he/she has arrived at a certain network access point such as, for example, at the office, at school, at the university or at home. The growing availability of IP-capable mobile units such as for example PDAs, cellular phones and laptops are beginning to change our idea of the Internet. An analogous transition from fixed nodes in networks to more flexible requirements based on higher mobility has just begun. In mobile telephone use, for example, this tendency has shown itself, among other things, in new standards such as WAP, GPRS or UMTS. To be able to better understand the difference between the present reality and the IP connection possibilities of the future, one can take as a comparison the development of telephony during the last twenty years in the direction of mobility. The demand in the private as well as in the business sector for a worldwide independent wireless access to LANs (e.g. in airports, conference centers, trade fair grounds, cites, etc.) using laptops, PDAs etc. is enormous. However the WLANs based, for example, on IP today do not offer the service, such as provided e.g. with GSM/GPRS, which would permit free roaming of the user. These services should also, apart from security mechanisms such as in GSM/GPRS, include facilities for service authentication and for billing, i.e. inclusion of billing for the service provided etc. On the other hand, such a service is also not being offered by existing GSM/GPRS operators. It is not only the roaming between different WLANs that is important. Through the enormous growth in information technology with WLANs (with Internet access, etc.) and also the great growth in mobile telephone usage, it is useful to combine both these worlds. Only the combination of both these worlds makes possible easy and automatic roaming for wireless LANS, as the user of mobile telephone technology is accustomed to. Thus there exists the demand for service providers enabling standard-spanning roaming between different WLAN service providers and between WLAN service providers and GSM/GPRS service providers.

Computer networks or local area networks (LANs) consist normally of so-called nodes, which are connected via physical mediums such as coaxial cables, twisted pair cables or optical fiber cables. These LANs are also known as wired LANs (wired fixed networks). During the last years also cable-free LANs or so-called wireless LANs have become increasingly popular (e.g. through developments such as the AirPort-System by Apple Computer, Inc., etc.). Wireless LANs are especially suitable for linking mobile units (nodes), such as e.g. laptops, notebooks, PDAs (Personal Digital Assistant) or mobile radio devices, in particular mobile radio telephones, using an appropriate interface, in a local computer network. The mobile nodes are equipped with an adaptor including a transmitter/receiver as well as a controller card (such as e.g. an infrared (IR) adapter or a low frequency radio wave adapter). The advantage of such mobile nodes is that they can be moved freely within the range of the wireless LAN. The mobile nodes either communicate directly with each other (peer-to-peer wireless LAN), or send their signal to a base station which amplifies the signal and/or passes it on. The base stations may also incorporate bridge functions. Via such base stations with bridge functions, the so-called Access Points (APs), the mobile nodes of the wireless LAN can gain access to a wired LAN. Typical network functions of an access point comprise the transmission of messages from one mobile node to another, the transmission of messages from a wired LAN to a mobile node and the transmission of messages from a mobile node to a wired LAN.

The physical range of an AP is called the Basic Service Area (BSA). If a mobile node is located within the BSA of an AP it can communicate with this AP, providing the AP is also within the signal range (Dynamic Service Area (DSA)) of the mobile node. Normally several APs are assigned to an access server that, among other things, monitors and administers the authorization of the mobile nodes via a user database. The total area that is covered by the APs of an access server is known as the so-called hot spot. Mobile nodes are typically provided with a signal strength from 100 mwatts up to one watt. To be able to connect the wireless LAN to the wired LAN it is important for the AP to determine if a certain message (information frame) within the network is destined for a node that is within the wired LAN or within the wireless LAN, and if required to forward this information to the corresponding node. For this purpose APs are provided with so-called bridge functions, e.g. in accordance with IEEE Standard Std 802.1D-1990 Media Access Control Bridge" (31-74 ff). For these bridge functions a new mobile node in the wireless LAN is typically registered in an FDB (Filtering Database) of the AP within whose range the node lies. With each information frame on the LAN the AP compares the target address with the addresses (MAC Addresses (Media Control Addresses)) which it has stored in its FDB, and transmits, rejects or transfers the frame to the wired LAN or respectively to the wireless LAN.

With mobile network usage, an existing IP access to the mobile node by applications should not be interrupted if the user changes his location within the network. On the contrary, all connections and interface changes, such as e.g. changes to different hot spots and especially different networks (Ethernet, mobile radio phone network, WLAN, Bluetooth, etc.), should be able to be performed automatically and not interactively, so that the user does not even have to be aware of the change taking place. This also applies, for example, during the use of real-time applications. True mobile IP computing exhibits many advantages based on a stable access to the Internet at all times. With such an access, work can be organized freely and independently from the desk. The demands made on mobile nodes in networks distinguish themselves in various ways from the initially mentioned development in mobile radio technology, however. The end points in the mobile radio system are, generally speaking, human beings. In mobile nodes, however, computer applications can perform interactions between other network participants without any human actions or interventions. Extensive examples of this can be found in airplanes, ships and automobiles. Thus especially mobile computing with Internet access can make sense together with other applications such as e.g. in combination with positioning devices, such as the satellite-based GPS (Global Positioning System).

One of the problems with mobile network access via Internet Protocol (IP) is that the IP protocol, which is used to route the data packets in the network from the source address to the target address (Destination Address), uses so-called IP addresses (IP: Internet Protocol). These addresses are assigned to a fixed location in the network, similar to the way telephone numbers of fixed networks are assigned to a physical wall socket. When the destination address of the data packets is a mobile node, this means that with each network location change a new IP network address must be assigned, which renders transparent mobile access impossible. These problems were solved by the mobile IP standard (IETF RFC 2002, October 1996) of the Internet Engineering Task Force (IETF), in that the mobile IP allows the mobile node to use two IP addresses. One of them is the normal static IP address (home address), which specifies the location of the home network, while the second is a dynamic care-of address, which designates the current location of the mobile node within the network. The assignment of the two addresses makes it possible to reroute the IP data packets to the correct current address of the mobile node.

One of the most frequently used protocols for authentication of a user within a wireless LAN is the open source protocol IEEE 802.1x (in the current version 802.11) from the Institute of Electrical and Electronics Engineers Standards Association. The IEEE 802.1x authentication permits authenticated access to IEEE 802 media such as, for example, Ethernet, Token Ring and/or 802.11 wireless LAN. The 802.11 protocol generates for wireless LAN, i.e. for wireless local networks, a 1 Mbps, 2 Mbps or 11 Mbps transmission in the 2.4 GHz band, whereby either FHSS (Frequency Hopping Spread Spectrum) or DSSS (Direct Sequence Spread Spectrum) is used. For authentication, 802.1x supports authentication EAP (Extensible Authentication Protocol) and TLS (Wireless Transport Layer Security). 802.11 also supports RADIUS. Although the RADIUS support is optional in 802.1x, it is to be expected that most of the 802.1x authenticators will support RADIUS. The IEEE 802.1x protocol is a so-called port-based authentication protocol. It can be used in every environment in which a port, i.e. the interface of a unit, can be specified. With the authentication based on 802.1x, three units can be differentiated. The unit of the user (supplicant/client), the authenticator and the authentication server. It is the role of the authenticator to authenticate the supplicant. Authenticator and supplicant are connected, for example, via a point-to-point LAN segment or a 802.11 wireless LAN. Authenticator and supplicant have a defined port, a so-called Port Access Entry (PAE), which defines a physical or virtual 802.1x port. The authentication server generates the authentication services required by the authenticator. In this way it verifies the entitlement data supplied by the supplicant regarding the assumed identity.

The authentication servers are usually based on RADIUS (Remote Authentication Dial-In User Service) of the IETF (Internet Engineering Task Force). The use of the RADIUS authentication protocol and accounting system is widespread in network units such as, for example, routers, modem servers, switches, etc., and is used by most Internet service providers (ISPs). If a user dials into an ISP he/she has to enter normally a user name and password. The Radius server verifies this information, and authorizes the user for access to the ISP system. The reason for the widespread use of RADIUS lies among other things in that network units cannot generally cope with a large number of network users each with different authentication data, since this would exceed, for example, the storage capacity of the individual network units. RADIUS permits the central administration of a multiplicity of network users (addition, deletion of users, etc.). This is therefore a necessary prerequisite of the ISPs (Internet Service Providers) for their service because their number of users often amounts to several thousand to several tens of thousands. RADIUS further generates a certain permanent protection against hackers. The remote authentication by RADIUS based on TACACS+ (Terminal Access Controller Access Control System+) and LDAP (Lightweight Directory Access Protocol) is relatively secure against hackers. Many other remote authentication protocols, in contrast, have only temporary or insufficient or no protection against hacker attacks at all. Another advantage is that RADIUS is at present the de-facto standard for remote authentication, whereby RADIUS is also supported by nearly all systems, which is not the case for other protocols.

The above-mentioned Extensible Authentication Protocol (EAP) is in reality an extension of the PPP (Point-to-Point Protocol) and is defined by the Request for Comments (RFC) 2284 PPP Extensible Authentication Protocol (EAP) of the IETF. By way of PPP a computer can be connected to the server of an ISP, for example. PPP works in the data link layer of the OSI model, and sends the TCP/IP packets of the computer to the server of the ISP that forms the interface to the Internet. In contrast to the older SLIP protocol (Serial Line Internet Protocol), PPP functions more stably and has error correction facilities. The extensible authentication protocol is a protocol on a very general level that supports diverse authentication methods such as, for example, token cards, Kerberos of the Massachusetts Institute of Technology (MIT), strike off passwords, certificates, public key authentication and smart cards or the so-called Integrated Circuit Cards (ICC). IEEE 802.1x defines the specifications such as EAP that must be integrated into LAN frames. With communication in wireless networks via EAPs, a user requests from an access point via wireless communication, i.e. a connection hub for the remote access client or supplicant to the WLAN, access to the wireless LAN. The AP then requests from the supplicant the identification of the user, and transmits the identification to the above-mentioned authentication server, that is based, for example, on RADIUS. The authentication server allows the Access Point to recheck the identification of the user. The AP collects this authentication data from the supplicant and transmits these to the authentication server which terminates the authentication method.

With EAP an arbitrary authentication method generates a remote access connection. The precise authentication scheme is respectively determined between the supplicant and the authenticator (that means the remote access server, the Internet Authentication Service (IAS) server, or respectively for WLAN the access point). As mentioned above, EAP thereby supports many different authentication schemes such as, for example, generic Token Card, MD5-Challenge, Transport Level Security (TLS) for smart cards, S/Key and possible future authentication technologies. EAP permits an unlimited number of question/answer communications between the supplicant and the authenticator, whereby the authenticator or respectively the authentication server requests specific authentication information and the supplicant, i.e. the remote access client responds. As an example, via the authenticator, the authentication server can request individually from the so-called security token cards a user name, then a PIN (Personal Identity Number) and finally a token card value from the supplicant. A further authentication level is thereby performed for each question/answer cycle. If all authentication levels are successfully answered, the supplicant is authenticated. A specific EAP authentication scheme is termed an EAP type. Both sides, i.e. supplicant and authenticator, must support the same EAP type so that authentication can be carried out. As mentioned, this is determined at the start between supplicant and authenticator. Authentication servers based on RADIUS normally support EAP, which offers the possibility of sending EAP messages to a RADIUS server.

In the state of the art, EAP-based methods for authentication of a user and for allocation of session keys to the user via the GSM Subscriber Identity Module (SIM) are also known. The GSM authentication is based on a question-answer method, the so-called Challenge-Response Method. As a challenge (question) the authentication algorithm of the SIM card is given a 128-bit random number (generally known as a RAND). Then a confidential algorithm, specific to the respective operator, runs on the SIM card, which algorithm receives as an input the random number RAND and a confidential key Ki, stored on the SIM card, out of which it generates a 32 bit response (SRES) and a 64 bit key Kc. Kc is designed for encoding the data transfer via wireless interfaces (GSM Technical Specification GSM 03.20 (ETS 300 534): "Digital cellular telecommunication system (Phase 2); Security related network functions", European Telecommunications Standards Institute, August 1997). Used in the EAP/SIM authentication are several RAND challenges to generate several 64 bit Kc keys. These Kc keys are combined into a longer session key. With EAP/SIM the normal GSM authentication method is extended by means of the RAND challenges additionally having a Message Authentication Code (MAC), to generate mutual authentication. To perform the GSM authentication the authentication server should have an interface with the GSM network. The authentication server operates consequently as a gateway between the Internet Authentication Service (IAS) server network and the GSM authentication infrastructure. At the start of the EAP/SIM authentication, with a first EAP request by the authenticator, the authentication server requests from the supplicant, among other things, the International Mobile Subscriber Identity (IMSI) of the user. With the IMSI the authentication server receives on request from the authentication center (AuC) of the corresponding cellular wireless network operator, normally known in the GSM network as Home Location Register (HLR) or respectively Visitor Location Register (VLR), n GSM triplets. From the triplets the authentication server obtains a Message Identification Code for n* RAND and a lifespan for the key (together MAC_RAND), as well as a session key. With this the authentication server can perform the GSM authentication on the SIM card of the supplicant or respectively of the user. Since RAND are provided to the supplicant together with the Message Authentication Code MAC_Rand, it becomes possible for the supplicant to verify if the RANDs are new and were generated through the GSM network.

The state of the art does have a wide variety of disadvantages, however. In fact, it is possible, for example, with an EAP-SIM authentication to use the authentication method from the GSM networks in the wireless LAN technology for authentication of supplicants or respectively of remote access clients, provided the user has an IMSI with a GSM provider. It is also possible in principle, by means of e.g. mobile IP of the IETF (Internet Engineering Task Force), to reroute (route) data streams to the respective mobile remote access client registered with an access server via an access point. By far not all the problems of mobile network usage allowing a really free roaming of the user are thereby solved, however. One of the problems is that in the IP network the prerequisites, required in the GSM standard, with respect to security, billing and service authorization are no longer there. This is intrinsically connected with the open architecture of the IP protocol. That means that in the IP standard a lot of data are missing which are absolutely necessary for full compatibility with GSM networks. Moreover an access server based for example on RADIUS supplies a single data stream. This cannot simply be mapped to the multi-part data stream of the GSM standard. Another drawback in the state of the art is that today wireless LANs are based on individual hot spots (i.e. the basic server area of the access points of an access server), which are on offer from various software and hardware developers around the world. This makes difficult the combination of the two worlds since such gateway functions must each be adapted individually to the specific solution. The technical specifications for the GSM authentication interface may be referenced in MAP (Mobile Application Part) GSM 09.02 Phase 1 Version 3.10.0.

It is the object of this invention to propose a new method for mobile nodes in heterogeneous WLANs. In particular, it should be made possible for the user to move between different hot spots without any difficulty (roaming), without having to bother about registering, billing, service authorization etc. at the various WLAN service providers, i.e. enjoy the same convenience as he is accustomed to from mobile radio technology such as GSM. The invention shall guarantee for the user and service provider in WLANs the required components for billing, service authorization and security.

These objects are achieved according to the present invention through the elements of the independent claims. Further preferred embodiments follow moreover from the dependent claims and from the specification.

These objects are achieved through the invention in particular in that between heterogeneous WLANs and/or GSM/GPRS/UMTS networks, for authentication, via a wireless interface within a basic service area of a WLAN, a mobile IP node requests access to the WLAN at an access point, which basic service area of the WLAN includes one or more access points assigned to an access server, in that upon request from the access server, the mobile IP node transmits an IMSI stored on a SIM card of the mobile IP node to the access server, and in that by means of an SIM-RADIUS module the IMSI of the IP node is stored, based on the IMSI and by means of information stored in an SIM user data base, the logic IP data channel of the WLAN being user-specifically supplemented towards corresponding GSM data for signal and data channels of a GSM network, by means of a SIM gateway module, to perform the authentication of the IP node, the necessary SS7/MAP functions (authentication and/or authorization and/or configuration information) being generated based on the GSM data, the SIM-RADIUS module carrying out the authentication of the mobile IP node at a HLR and/or VLR of a GSM network by means of a SIM user database and SIM gateway module, based on the IMSI of the SIM card of the mobile node, and, with successful authentication, a location update as well as a service authorization being performed at the HLR and/or VLR, and the mobile IP node receiving a corresponding entry in a customer database of the access server, the WLAN being released for use by the mobile IP node. As an embodiment variant, with successful authentication, an authorization of the mobile IP node can be carried out in addition to the location update at the HLR and/or VLR, a corresponding user profile based on the IMSI being downloaded at the HLR and/or VLR. That means the service authorization of the user is based on the query of the corresponding user profile (end user profile) at the HLR and/or VLR. The mentioned variant has the advantage among other things that an automatic roaming between different and heterogeneous WLANs and GSM networks becomes possible. Through the combination of the WLAN technology, especially the IP networks, with the GSM technology, the roaming of the user becomes possible, without his having to bother about registration, billing, service authorization etc. with the different WLAN service providers. This means that the user enjoys the same convenience as he/she is accustomed to from mobile radio technology such as e.g. GSM. At the same time it is possible in a completely new way to combine the advantages of the open IP world (access to the worldwide Internet etc.) with the advantages of the GSM standard (security, billing, service authorization, etc.). The invention also makes it possible to create a method for roaming in WLANs without a corresponding module having to be installed in each access server. On the contrary, by using RADIUS the infrastructure (WLAN/GSM) can be taken over unchanged.

In an embodiment variant, for authentication of the mobile IP node the IMSI stored on the SIM card of the mobile IP node is only used up to one or more of the first authentication stages and for all further authentication stages the IMSI is replaced by a generated temporary IMSI (TIMSI). This has the advantage, among other things, that the security during the authentication or respectively authorization can be increased.

In an embodiment variant, the authentication of the mobile IP node is performed with an Extensible Authentication Protocol (EAP). This has the advantage, among other things, that, in combination with RADIUS, a method is created completely independent of hardware and manufacturer (vendor). EAP especially offers the necessary security mechanisms for execution of the authentication.

In an embodiment variant, the data stream of the mobile IP node during access to the WLAN from the access point is directed via a mobile radio network service provider. This has the advantage, among other things, that the mobile radio network provider has the complete control over the data stream. In this way he/she can specifically assign service authorizations, perform detailed billing, incorporate security mechanisms and/or offer personalized services. Among other things he can thereby combine the open, difficult-to-control IP world with e.g. the Internet with the advantages of the GSM world. This has played a big role, e.g. with respect to liability issues of the provider or service vendor, especially recently.

In another embodiment variant, the mobile radio network service provider, based on the authentication by means of the IMSI, issues the respective service authorization for use of different services and/or performs the billing of the service availed of. This embodiment variant has, among other things, the same advantages as the previous embodiment variant.

In a further embodiment variant, the SIM user database is connected to a sync database for changing or deleting existing user datasets or for inserting new user datasets, the comparison of the databases being carried out periodically and/or initiated by changes in the sync database or through failure of the SIM user database. This has the advantage that, for changing or deleting existing user datasets or for inserting new user datasets, the mobile radio network operators can proceed in the same way as up to now with their user databases, i.e. without their having to purchase or maintain additional systems.

In an embodiment variant, by means of a clearing module for the billing, the billing records of the heterogeneous WLANs are synchronized with the user data and processed based on the GSM standard TAP. This has the advantage, among other things, that service providers can use the usual clearing and billing method of the GSM standard, without modification of their software and/or hardware. In particular, the remaining breakdown of the IP data stream into a GSM data stream also takes place thereby.

It should be stressed here that, in addition to the method according to the invention, the present invention also relates to a system for carrying out this method.

Embodiment variants of the present invention will be described in the following with reference to examples. The examples of the embodiments are illustrated by the following enclosed figures:

FIG. 1 shows a block diagram schematically illustrating a method and a system according to the invention for automatic roaming between heterogeneous WLANs and/or GSM/GPRS/UMTS networks, mobile IP nodes being connected, via an interface having contacts, to an SIM card 201 and/or ESIM (Electronic SIM), and accessing by means of a wireless connection 48 access points 21/22 of the WLAN. An access server 23 of the WLAN authenticates the mobile IP node 20 based on an IMSI stored on the SIM card 201 at an HLR 37 and/or VLR 37 of a GSM mobile radio network.

Figure 2:
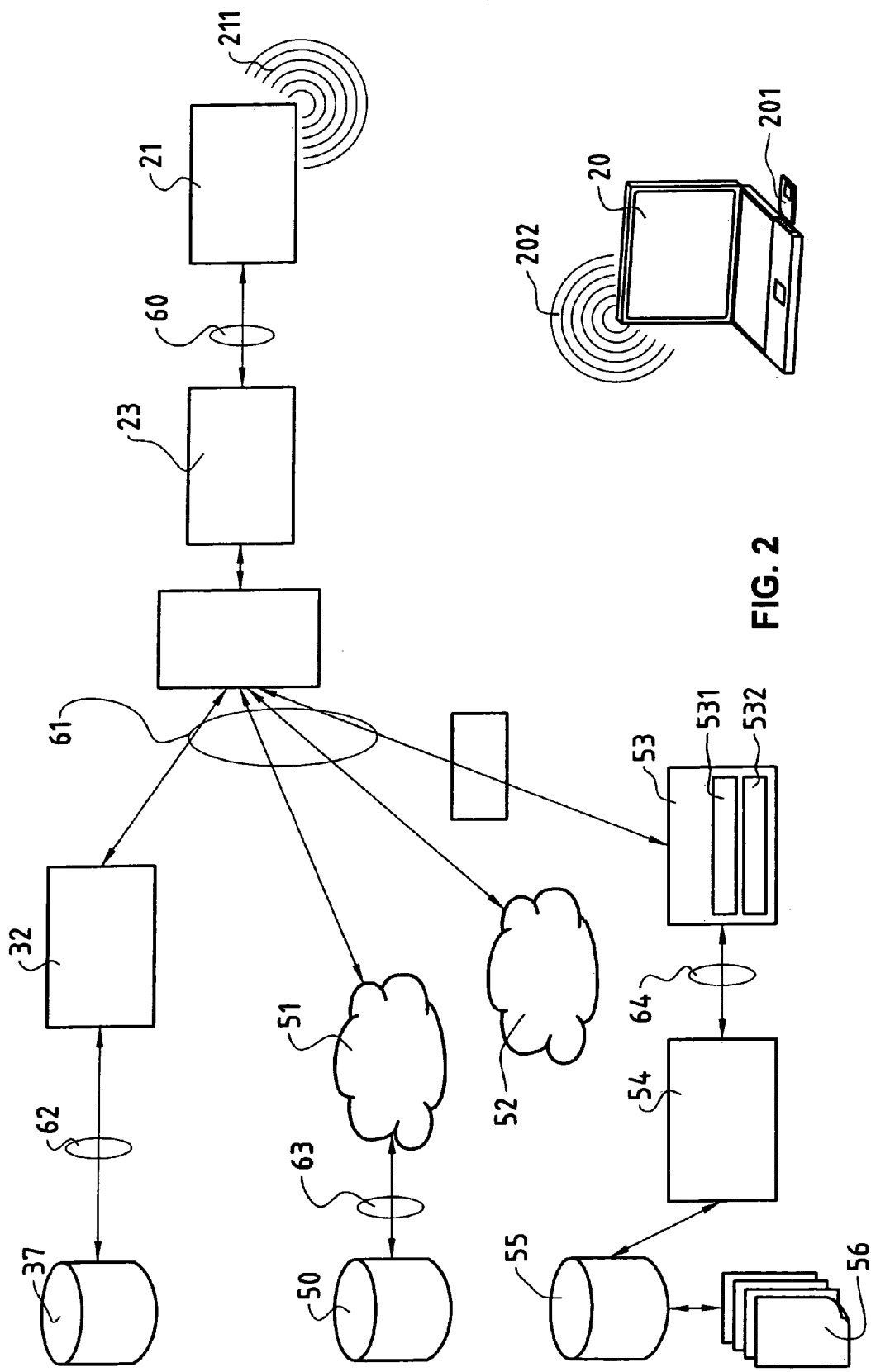

FIG. 2 shows a block diagram likewise illustrating schematically a method and system according to the invention for automatic roaming between heterogeneous WLANs and/or GSM/GPRS/UMTS networks, mobile IP nodes 20 being connected to a SIM card 201, via an interface having contacts, and accessing a WLAN by means of a wireless connection 48. The WLAN is connected via an access server 23 to a GSM mobile radio network, in particular to an HLR 37 and/or VLR 37, to a GGSN (Gateway GPRS Support Node) 50 via a GRX module 51 (GRX: GPRS Roaming exchange), via an Internet service provider 52 and via a clearing provider 53 for the clearing of the utilized services via a clearing system operator 54, <and> to the corresponding billing system 55 of the Internet service provider 52. The reference numbers 60-64 are bidirectional network connections.

Figure 3:
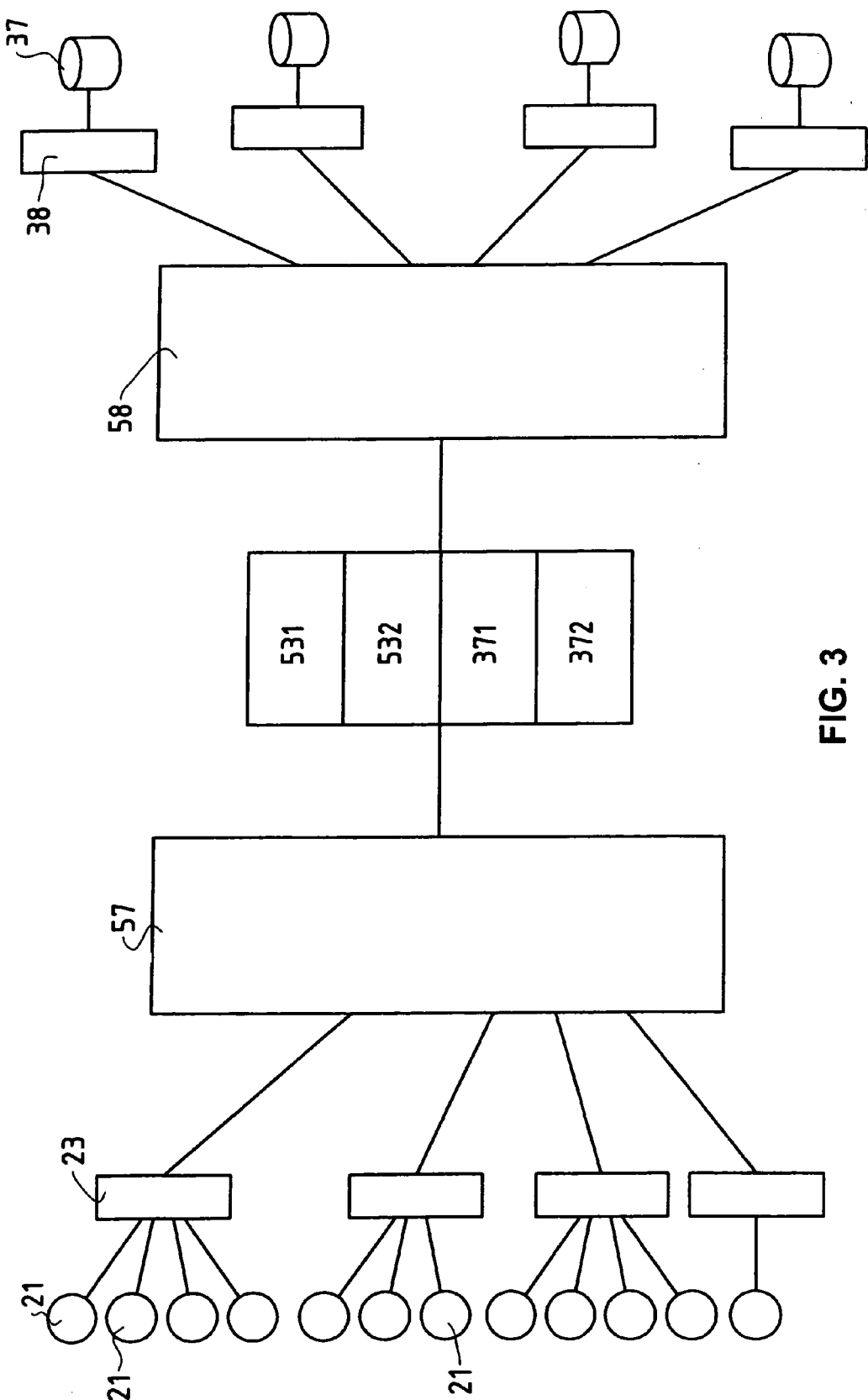

FIG. 3 shows a block diagram illustrating schematically a method and system for automatic roaming between heterogeneous WLANs and/or GSM/GPRS/UMTS networks, the open IP world being connected to the more restrictive GSM world, by means of the method and system according to the invention, via interfaces for the authentication 371 and authorization 372 (SS7/MAP), service authorization 531 and billing 532.

Figure 4:
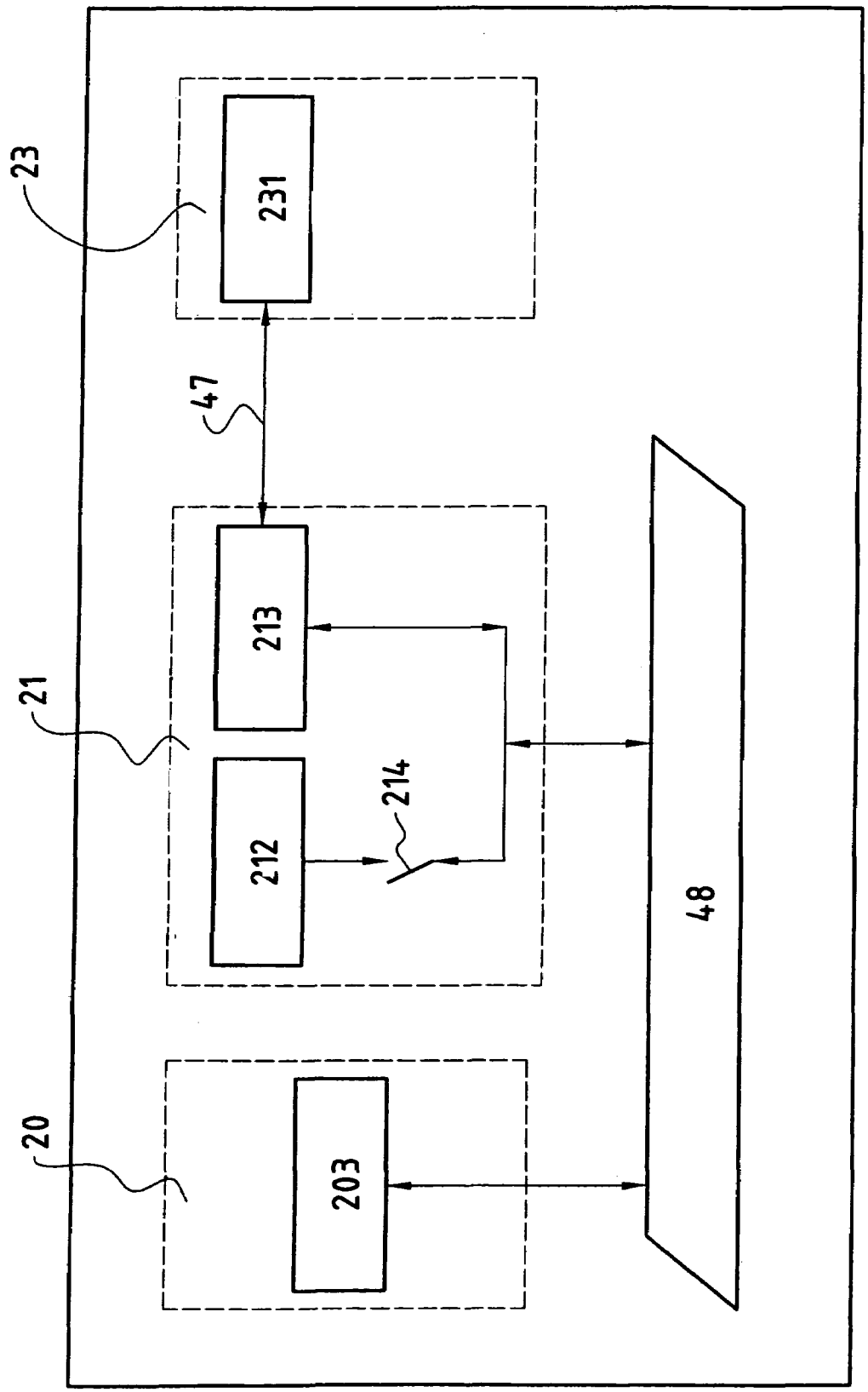

FIG. 4 shows a block diagram illustrating schematically the set-up of an IEEE 802.1x port-based authentication method, the supplicant or remote access client 20 being authenticated via an authenticator or remote access server 21 at an authentication server 23, the WLAN being based on IEEE 802.11.

Figure 5:
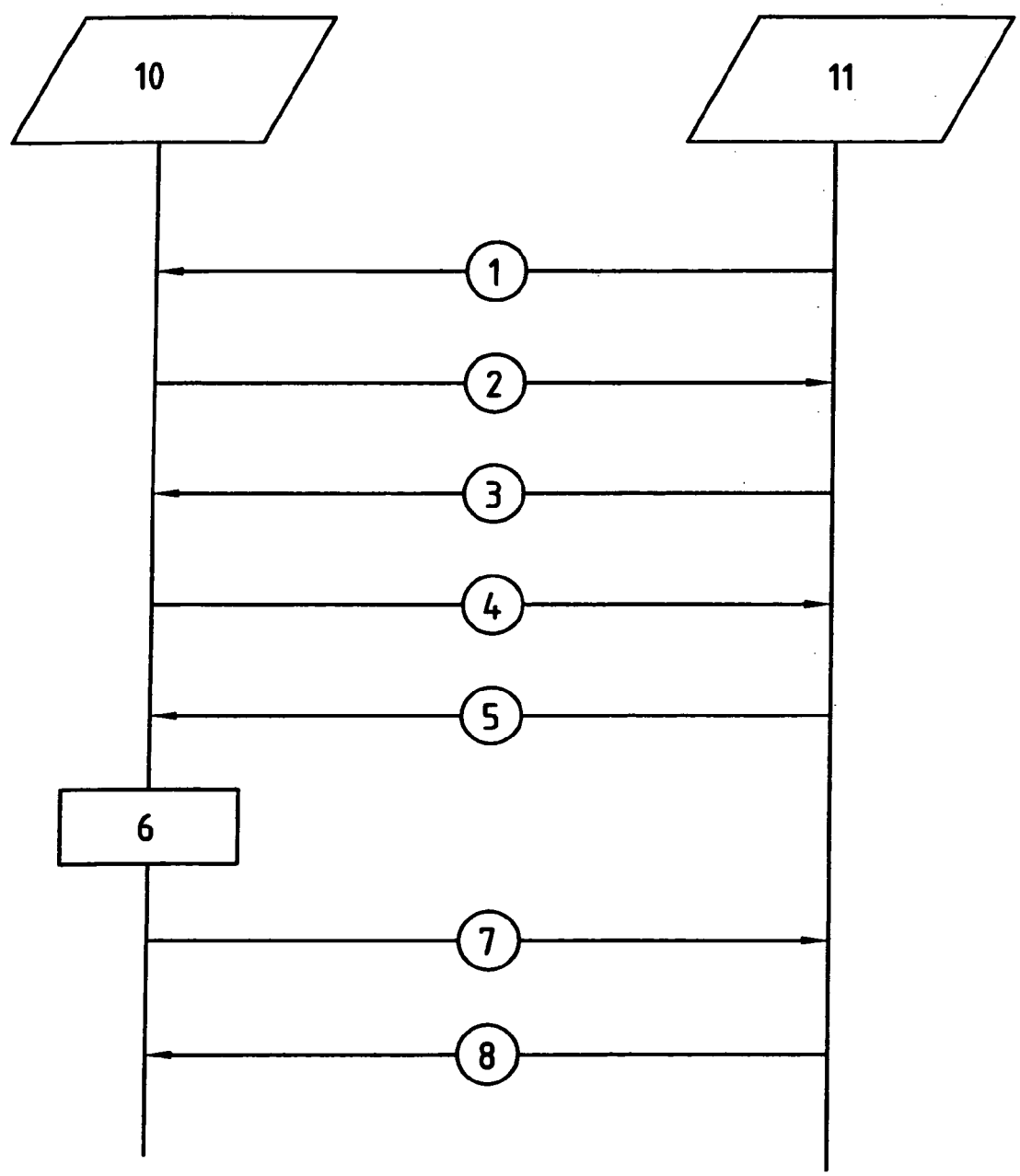

FIG. 5 shows a block diagram illustrating schematically a possible embodiment variant for SIM authentication by means of Extensible Authentication Protocol (EAP), a GSM-based challenge-response method being used.

FIG. 1 illustrates an architecture that can be used to implement the invention. FIG. 1 shows a block diagram illustrating schematically a method and system according to the invention for automatic roaming between heterogeneous WLANs and/or GSM/GPRS/UMTS networks. The reference numeral 20 in FIG. 1 pertains to a mobile IP node which has the necessary infrastructure including hardware and software components at its disposal to achieve a described method and/or system according to the invention. To be understood by mobile nodes 20 are, among other things, all possible so-called Customer Premise Equipment (CPE) that are provided for use at various network locations and/or in various networks. These include, for example, all IP-capable devices such as e.g. PDAs, mobile radio telephones and laptops. The mobile CPEs or nodes 20 have one or more different physical network interfaces that are also able to support a plurality of different network standards. The physical network interfaces of the mobile nodes can include, for instance, interfaces to WLAN (Wireless Local Area Network), Bluetooth, GSM (Global System for Mobile Communication), GPRS (Generalized Packet Radio Service), USSD (Unstructured Supplementary Services Data), UMTS (Universal Mobile Telecommunications System) and/or Ethernet or another Wired LAN (Local Area Network) etc., The reference number 48 accordingly stands for the different heterogeneous networks such as, for example, a Bluetooth Network, e.g. for installations in roofed-over areas, a mobile radio network with GSM and/or UMTS, etc., a wireless LAN, e.g. based on IEEE wireless 802.1x, but also a wired LAN, i.e. a local fixed network in particular also the PSTN (Public Switched Telephone Network), etc. In principle it is to be said that the method and/or system according to the invention is not tied to a specific network standard, provided that the features according to the invention are present, but can be achieved with any LAN. The interfaces 202 of the mobile IP node can not only be packet-switched interfaces as are used directly by network protocols such as e.g. Ethernet or Token Ring, but can also be circuit-switched interfaces that can be used with protocols such as PPP (Point to Point Protocol), SLIP (Serial Line Internet Protocol) or GPRS (Generalized Packet Radio Service), i.e. those interfaces for example that do not have a network address such as a MAC or a DLC address. As partially mentioned before the communication can, for example, take place over the LAN for instance by means of special short messages, e.g. SMS (Short Message Services), EMS (Enhanced Message Services), over a signalling channel such as e.g. USSD (Unstructured Supplementary Services Data) or other technologies, like MExE (Mobile Execution Environment), GPRS (Generalized Packet Radio Service), WAP (Wireless Application Protocol) or UMTS (Universal Mobile Telecommunications System), or over IEEE wireless 802.1x or via another user information channel. The mobile IP node 20 can include a mobile IP module and/or an IPsec module. The main task of the mobile IP consists of authenticating the IP node 20 in the IP network and of correspondingly rerouting the IP packets that have the mobile node 20 as the destination address. For further mobile IP specifications, also see for example IETF (Internet Engineering Task Force) RFC 2002, IEEE Comm. Vol. 35 No. 5 1997, etc. Mobile IP especially supports IPv6 and IPv4. The mobile IP capabilities can preferably be combined with the security mechanisms of an IPsec (IP security protocol) module to guarantee secure mobile data management in the public Internet. IPsec (IP security protocol) generates authentication/confidentiality mechanisms packet-wise or socket-wise between network hubs that both utilize IPsec. One of the flexibilities of IPsec lies especially in that it can be configured packet-wise as well as for individual sockets. IPsec supports IPvx, especially IPv6 and IPv4. For detailed IPsec-Specifications refer, for example, to Pete Loshin: IP Security Architecture; Morgan Kaufmann Publishers; November 1999 or A Technical Guide to IPsec; James S et al.; CRC Press, LLC; December 2000, etc. Although IPsec is used in this embodiment example as an example in describing the use of security protocols on the IP level, all other possible security protocols or security mechanisms or even the omission of security protocols are conceivable according to the invention.

Furthermore, via an interface having contacts, the mobile IP node 20 is connected to a SIM card 201 (SIM: Subscriber Identity Module), on which the IMSI (International Mobile Subscriber Identifier) of a user of GSM networks is stored. The SIM can be achieved both through hardware in the form of a SIM card and/or through software in the form of an electronic SIM. For authentication the mobile IP node 20 requests via a wireless interface 202 within the basic service area of a WLAN at an access point 21/22 access to the WLAN. As already described, the different WLANs of different hot spots can embrace heterogeneous network standards and protocols such as, for example, WLAN based on the IEEE wireless 802.1x, Bluetooth etc., The basic service area of the WLAN encompasses one or more access points 21/22 assigned to an access server 23. The mobile IP node 20 transmits to the access server 23, upon request of the access server 23, an IMSI stored on the SIM card 201 of the mobile IP node 20. The IMSI of the mobile IP node 20 is stored using a SIM-RADIUS module 30. Based on the IMSI, the logic IP data channel of the WLAN is user-specifically supplemented towards corresponding GSM data for signal and data channels of a GSM network by means of information stored in an SIM user database 34. The GSM System encompasses data channels, the so-called traffic channels, and control signal channels, the so-called signalling channels. The traffic channels (e.g. GPRS, GSM-voice, GSM-data, etc.) are reserved for user data, while the signalling channels (e.g. MAP, SS7, etc.) are used for network management, control functions etc. The logical channels cannot be used over the interface simultaneously, but only in certain combinations according to the GSM specifications. By means of a SIM gateway module 32, to perform the authentication of the IP node based on the GSM data, the required SS7/MAP functions (authentication and/or authorization and/or configuration information) are generated, the SIM-RADIUS module 30 carrying out the authentication of the mobile IP node at an HLR 37 (Home Location Register) and/or VLR 37 (Visitor Location Register) of a GSM network, by means of SIM user database 34 and SIM gateway module 32, based on the IMSI of the SIM card 201 of the mobile node 20 As an embodiment variant, with successful authentication, in addition to the location update at the HLR (37) and/or VLR 37, an authorization of the mobile IP node 20 can be performed, a corresponding user profile based on the IMSI being downloaded from the HLR 37 and/or VLR 37. It is also conceivable that, for the authentication of the mobile IP node 20, the IMSI, stored on the SIM card of the mobile IP node 20, is used only at one or more of the first authentication stages, and for all further authentication stages the IMSI is replaced by a generated temporary IMSI (TIMSI). For billing, the billing records of the heterogeneous WLANs can be synchronized with the user data (IMSI/TIMSI), by means of a clearing module 533, and correspondingly processed, so that these can be taken over, for example in the GSM standard TAP (Transferred Account Procedure), more especially in the TAP-3 standard, by mobile radio service providers, without adaptation of their billing system, for further use for their customers. The Transferred Account Procedure is a protocol for accounting between different network operators, version 3 (TAP-3) also handling the billing of value added services in GPRS.

As illustrated in FIG. 5, the authentication of the mobile IP node 20 can be performed by means of the Extensible Authentication Protocol (EAP). The following challenge-response method can be adopted, for example, for the EAP-based method for authentication of a user and for allocation of session keys to the user by means of the GSM Subscriber Identity Module (SIM). The authentication algorithm of the SIM card is given, as a challenge (question), a 128 bit random number (RAND). A confidential algorithm, specific for the respective operator, then runs on the SIM card that receives as input the random number RAND and a secret key Ki, stored on the SIM card, and generates therefrom a 32-bit response (SRES) and a 64-bit key Kc. Kc serves to encode the data transfer via wireless interfaces (GSM Technical Specification GSM 03.20 (ETS 300 534): "Digital cellular telecommunication system (Phase 2); Security related network functions," European Telecommunications Standards Institute, August 1997). For authentication several RAND challenges are used to generate several 64 bit Kc keys. These Kc keys are combined to a longer Session Key. FIG. 4 shows schematically the set-up between the mobile IP node 20, the access point 21 and the access server 23 in an IEEE 802.1x port-based authentication method, the mobile IP node 20 (remote access client/supplicant) being authenticated via the access point 21 (authenticator) at the access server 23 (authentication server). The WLAN in this embodiment example is based on IEEE 802.11. In order to perform the GSM authentication, the SIM gateway module 32 functions as a gateway between Internet Authentication Service (IAS) server network and the GSM authentication infrastructure, i.e. the access point 21/22 or respectively the access server 23 and the HLR 37 or respectively the VLR 37. At the start of the EAP/SIM authentication, the access server 23 requests with a first EAP request 1 through the access point 21/22 from the mobile IP node 20, among other things, the International Mobile Subscriber Identity (IMSI) of the user. This is transmitted by the mobile IP node via EAP response 2 to the access Point 21/22. Upon a triplet request from the respective HLR 37, or respectively named VLR 37, the access server 23 receives, with the IMSI, n GSM triplets. Based on the triplets, the access server 23 is able to receive a message authentication code for n* RAND and a lifespan for the key (together MAC_RAND) as well as a session key. In a $3^{rd}$ EAP step 3 (FIG. 5) the access server 23 then sends, for example, an EAP request of type 18 (SIM) to the mobile IP node 20, and receives the corresponding EAP response 4. EAP data packets of SIM type additionally have a special subtype field. The first EAP request/SIM is of subtype 1 (start). This packet contains a list of the EAP/SIM protocol version numbers which are supported by the access server 23. The EAP response/SIM (start) 4 (FIG. 5) of the mobile IP node 20 receives the version number selected by the mobile IP node 20. The mobile IP node 20 must select a version number specified in the EAP request. The EAP response/SIM (start) of the mobile IP node 20 also contains a lifespan suggestion for the key and a random number NONCE_MT, which has been generated by the mobile IP node. All the subsequent EAP requests all contain the same version as the EAP response/SIM (start) data packet of the mobile IP node 20. As mentioned, to perform the GSM authentication, this embodiment variant possesses a SIM gateway module 32, that serves as a gateway between the access server 23 and the HLR 37 or respectively the VLR 37. After receipt of the EAP response/SIM, the access server 23 receives an n GSM triplet from the HLRNLR 37 of the GSM network. From the triplets the access server 23 calculates MAC_RAND and the session key K. The calculation of the cryptographic values of the SIM-generated session key K and of the message authentication codes MAC-Rand and MAC_SRES can be learned, for instance, from the document "HMAC: Keyed-Hashing for Message Authentication" by H. Krawczyk, M. Bellar and R. Canetti (RFC2104, February 1997). The next EAP request 5 (FIG. 5) of the access server 23 is of type SIM and subtype challenge. The request 5 contains the RAND challenges, the lifespan of the key determined by the access server 23, a message authentication code for the challenges and the lifespan (MAC_RAND). After receipt of the EAP request/SIM (challenge) 5, the GSM authentication algorithm 6 runs on the SIM card, and calculates a copy of MAC_RAND. The mobile IP node 20 checks that the calculated value of MAC_RAND is equal to the received value of MAC_RAND. If there is not a correspondence between the two values, the mobile IP node 20 aborts the authentication method and does not forward any of the authentication values calculated by the SIM card to the network. Since the RAND value is received together with the message authentication code MAC_RAND, the mobile IP node 20 can ensure that the RAND is new and was generated by the GSM network. If all checks have been correct, the mobile IP node 20 sends an EAP response/SIM (challenge) 7, which contains as an answer the MAC_SRES of the mobile IP nodes 20. The access server 23 checks that the MAC_RES is correct, and finally sends an EAP success data packet 8 (FIG. 5), which shows the mobile IP node 20 that the authentication was successful. The access server 23 can additionally send the received session key with the authentication report (EAP success) to the access point 21/22. With a successful authentication, a location update is carried out at the HLR 37 and/or VLR 37, and the mobile IP node 20 receives a corresponding entry in a customer database of the access server, the WLAN being released for use by the mobile IP node 20. As was mentioned, this has the advantage, among other things, that automatic roaming between different and heterogeneous WLANs becomes possible. Through the combination of WLAN technology, especially of the IP networks, with GSM technology, roaming of the user becomes possible without his/her having bother about registration, billing, service authorization, etc., at the respective WLAN service providers, i.e. the user enjoys the same convenience as he/she is accustomed to from mobile radio technology such as, for example, GSM. At the same time it is possible in a completely new way to combine the advantages of the open IP world (access to the worldwide Internet etc.) with the advantages of the GSM standard (security, billing, service authorization, etc.). The invention also makes it possible to create a method for roaming in WLANs without a corresponding module having to be installed in each access server. On the contrary, by using RADIUS, the infrastructure (WLAN/GSM) can be taken over unchanged. The invention thereby makes possible an automatic roaming between heterogeneous WLANs, GSM, GPRS and UMTS networks.

FIG. 3 shows in a block diagram, once again schematically, <in> a method and system according to the invention, how the open IP world 57 are <sic. is> connected to the more restrictive GSM world 58 via the interfaces of the authentication 371 and authorization 372 (SS7/MAP), service authorization 531 and billing 532. The reference number 38 thereby indicates different mobile radio network service providers with assigned HLRNLR 37. As an embodiment variant, it is conceivable for the data stream of the mobile IP node 20 during access to the WLAN to be directed from the access point 21/22 via the mobile radio network service providers 38. This allows the mobile radio network service provider 38 to grant, based on the authentication by means of the IMSI, user-specific service authorization for user of different services and/or to carry out user-specific billing of the service availed of. For the service authorization, after authentication of the user, apart from the location update at the HLRNLR 37, a user profile (end user profile) is downloaded, from which the corresponding information regarding the service authorization of the user can be ascertained. Based on the user profile, the corresponding authorization flags for release or denial of certain services are set in the mobile IP node 20. The service release could in principle also be performed, for example, by means of a module 214 directly at the access point 21/22 or, if the data stream is redirected, be carried out at the mobile radio network service provider 38.

It remains to be mentioned that, in an embodiment example extended from the above-mentioned embodiment example, the SIM user database 34 is connected to a sync module 35 and a sync database 36 for changing or deleting existing user datasets or inserting new user datasets, the comparison of the databases 34/36 being performed periodically and/or initiated through changes in the sync database 36 and/or through failure of the SIM user database 34. The sync module 35 and the sync database 36 can be achieved, like the other components according to the invention, through hardware or through software as discrete network components, e.g. as discrete IP node and/or GSM components, or assigned to another system component and/or integrated into another system component. With this embodiment variant, the mobile radio network service providers 38 can proceed in changing or deleting existing user datasets or in inserting new user datasets in the same way as before with their user databases, i.e. without having to purchase or maintain additional systems.

The invention claimed is:

1. A method for automatic roaming between heterogeneous WLANs and/or GSM/GPRS/UMTS networks, comprising:
   requesting access, via a mobile IP node, to a WLAN at an access point, a basic service area of the WLAN including one or more access points assigned to an access server;
   authenticating, via a wireless interface within the basic service area of the WLAN, the mobile IP node requesting access to the WLAN; and
   transmitting from the mobile IP node, upon request from the access server, an IMSI stored on a SIM card of the mobile IP node to the access server, the IMSI of the mobile IP node being stored in a database of a SIM-RADIUS module,
   wherein, based on the IMSI, a logical IP data channel of the WLAN is user-specifically supplemented towards corresponding GSM data for signal and data channels of a GSM network by means of information stored in a SIM user database,
   by means of a SIM gateway module, to perform an authentication of the mobile IP node, necessary SS7/MAP functions are generated based on the GSM data,
   by means of the SIM user database and the SIM gateway module, the SIM-RADIUS module performs the authentication of the mobile IP node at an HLR or a VLR of the GSM network, based on the IMSI of the SIM card of the mobile IP node,
   with successful authentication, (1) an authorization of the mobile IP node is performed, a corresponding user profile based on the IMSI being downloaded at the HLR and/or VLR, (2) the mobile IP node receives a corresponding entry in a customer database of the access server, and (3) the WLAN is released for use by the mobile IP node, and
   the SIM-RADIUS module and SIM gateway module are located on an open network and have direct access to a plurality of GSM networks on the open network for authentication at an HLR or a VLR of each of the plurality of GSM networks.

2. The method for automatic roaming between heterogeneous WLANs and/or GSM/GPRS/UMTS networks according to claim 1, wherein, in authenticating the mobile IP node, the IMSI stored on the SIM card of the mobile IP node is only used up to one or more of the first authentication stages then replaced by a generated temporary IMSI.

3. The method for automatic roaming between heterogeneous WLANs and/or GSM/GPRS/UMTS networks according to claim 1, wherein authenticating the mobile IP node is performed by means of an extensible authentication protocol.

4. The method for automatic roaming between heterogeneous WLANs and/or GSM/GPRS/UMTS networks according to claim 1, wherein, a data stream of the mobile IP node is directed via a mobile radio network service provider during access to the WLAN from the access point.

5. The method for automatic roaming between heterogeneous WLANs and/or GSM/GPRS/UMTS networks according to claim 4, wherein, based on authenticating by means of the IMSI, the mobile radio network service provider issues a corresponding service authorization for use of different services or performs billing of a used service.

6. The method for automatic roaming between heterogeneous WLANs and/or GSM/GPRS/UMTS networks according to claim 1, wherein, the SIM user database is connected to a sync module and a sync database for changing or deleting existing user datasets or for inserting new user datasets, a comparison of databases being carried out periodically or initiated by changes in the sync database or through failure of the SIM user database.

7. The method for automatic roaming between heterogeneous WLANs and/or GSM/GPRS/UMTS networks according to claim 1, wherein, by means of a clearing module for billing, billing records of the heterogeneous WLANs are synchronized with the user data and processed based on GSM-Standard TAP.

8. A system for automatic roaming between heterogeneous WLANs and/or GSM/GPRS/UMTS networks, comprising:
   at least one WLAN, with a basic service area, the basic service area of the at least one WLAN including one or more access points assigned to an access server, the one or more access points including a wireless interface for communication with at least one mobile IP node, the at least one mobile IP node including a SIM card for storage of an IMSI; and
   a SIM gateway module,
   wherein the access server further comprises:
      a SIM-RADIUS module that stores an IMSI database;
      a SIM user database; and
      a customer database;
   the access server, based on the IMSI and with information stored in the SIM user database, supplements a logical IP data channel of the WLAN user-specifically towards GSM data for signal and data channels of a GSM network, and, via the SIM gateway module, to perform an authentication of the mobile IP node, necessary SS7/MAP functions are generated based on the GSM data,
   by means of the SIM user database and the SIM gateway module, the SIM-RADIUS module performs the authentication of the mobile IP node at an HLR or a VLR of the GSM network, based on the IMSI of the SIM card of the mobile IP node, and
   with successful authentication, users of the WLAN can be entered into the customer database by means of the SIM-RADIUS module,
   wherein the SIM-RADIUS module and SIM gateway module are located on an open network and have direct access to a plurality of GSM networks on the open network for authentication at an HLR or a VLR of each of the plurality of GSM networks.

9. The system for automatic roaming between heterogeneous WLANs and/or GSM/GPRS/UMTS networks according to claim 8, wherein, in the authentication of the mobile IP node, the IMSI stored on the SIM card of the mobile IP node is replaceable by a temporary IMSI generated by means of a module.

10. The system for automatic roaming between heterogeneous WLANs and/or GSM/GPRS/UMTS networks according to claim 8, wherein the authentication of the mobile IP node can be performed by means of an extensible authentication protocol.

11. The system for automatic roaming between heterogeneous WLANs and/or GSM/GPRS/UMTS networks according to claim 8, wherein the system includes of a mobile radio network provider via whom a data stream of the mobile IP node is able to be rerouted from the access point during access to the WLAN.

12. The system for automatic roaming between heterogeneous WLANs and/or GSM/GPRS/UMTS networks according to claim 11, wherein the mobile radio network provider includes an authorization module, which, based on the authentication by means of the IMSI, issues a corresponding service authorization for use of different services, or includes a clearing system that carries out billing of a used service.

13. The system for automatic roaming between heterogeneous WLANs and/or GSM/GPRS/UMTS networks according to claim 8, further comprising a sync module with a sync database, by means of which the SIM user database is connected for changing or deleting existing user datasets or for inserting new user datasets, a comparison of databases being carried out periodically or initiated by changes in the sync database or through failure of the SIM user database.

14. The system for automatic roaming between heterogeneous WLANs and/or GSM/GPRS/UMTS networks according to claim 8, wherein, by means of a clearing module for billing, billing records of the heterogeneous WLANs are able to be synchronized with the user data and processed based on GSM-standard TAP.

\* \* \* \* \*